(12) United States Patent
Wei et al.

(10) Patent No.: US 11,297,355 B1
(45) Date of Patent: *Apr. 5, 2022

(54) CONTENT DELIVERY OF LIVE STREAMS WITH PLAYBACK-CONDITIONS-ADAPTIVE ENCODING

(71) Applicant: Amazon Technologies, Inc., Seattle, WA (US)

(72) Inventors: Hai Wei, Seattle, WA (US); Brian Manuel Alvarez, Seattle, WA (US); Yongjun Wu, Bellevue, WA (US); Abhishek Kumar, Redmond, WA (US); Lei Li, Yarrow Point, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/249,067

(22) Filed: Feb. 18, 2021

Related U.S. Application Data

(63) Continuation of application No. 16/817,129, filed on Mar. 12, 2020, now Pat. No. 10,958,947.

(51) Int. Cl.
| | | |
|---|---|---|
| *H04N 7/173* | (2011.01) | |
| *H04N 21/2187* | (2011.01) | |
| *H04N 21/2662* | (2011.01) | |
| *H04N 21/236* | (2011.01) | |
| *H04N 21/24* | (2011.01) | |

(52) U.S. Cl.
CPC ....... *H04N 21/2187* (2013.01); *H04N 21/236* (2013.01); *H04N 21/2402* (2013.01); *H04N 21/2407* (2013.01); *H04N 21/2662* (2013.01)

(58) Field of Classification Search
CPC .......... H04N 21/2187; H04N 21/2662; H04N 21/2407; H04N 21/236; H04N 21/2402
USPC ........................................................ 725/116
See application file for complete search history.

(56) References Cited

U.S. PATENT DOCUMENTS

| | | | | |
|---|---|---|---|---|
| 9,179,159 | B2* | 11/2015 | Good | H04N 19/46 |
| 10,116,721 | B1* | 10/2018 | LaPier | H04L 65/4084 |
| 10,469,555 | B2* | 11/2019 | Brueck | H04L 65/4069 |
| 10,616,590 | B1 | 4/2020 | Wei et al. | |
| 10,897,654 | B1 | 1/2021 | Wei et al. | |
| 2003/0055995 | A1* | 3/2003 | Ala-Honkola | H04N 21/44004 709/231 |
| 2005/0120132 | A1* | 6/2005 | Hutter | H04L 65/1006 709/234 |
| 2005/0135285 | A1* | 6/2005 | Vlot | H04N 21/4345 370/310 |
| 2007/0233693 | A1 | 10/2007 | Baxter et al. | |
| 2008/0022005 | A1* | 1/2008 | Wu | H04L 65/80 709/231 |

(Continued)

OTHER PUBLICATIONS

Aaron et al. "Per-Title Encode Optimization," Netflix Technology Blog, Dec. 14, 2015, https://medium.com/netflix-techblog/per-title-encode-optimization-7e99442b62a2, 13 pages.

(Continued)

*Primary Examiner* — Michael B. Pierorazio
(74) *Attorney, Agent, or Firm* — Weaver Austin Villeneuve & Sampson LLP

(57) ABSTRACT

Techniques are described for creating and using playback-conditions-adaptive live video encoding ladders.

20 Claims, 6 Drawing Sheets

(56) References Cited

U.S. PATENT DOCUMENTS

| | | | | |
|---|---|---|---|---|
| 2008/0170630 | A1* | 7/2008 | Falik | H04L 47/26 375/240.29 |
| 2009/0254657 | A1* | 10/2009 | Melnyk | H04N 21/6583 709/224 |
| 2010/0235472 | A1* | 9/2010 | Sood | H04L 67/06 709/219 |
| 2010/0312828 | A1* | 12/2010 | Besserglick | H04L 67/02 709/203 |
| 2010/0333148 | A1* | 12/2010 | Musha | H04N 21/2401 725/81 |
| 2011/0023076 | A1* | 1/2011 | Park | H04N 21/44004 725/116 |
| 2011/0058675 | A1* | 3/2011 | Brueck | H04N 21/8355 380/277 |
| 2011/0082914 | A1* | 4/2011 | Robert | H04N 21/4788 709/219 |
| 2011/0099594 | A1* | 4/2011 | Chen | H04N 21/4516 725/105 |
| 2014/0137162 | A1* | 5/2014 | McNamee | H04N 21/2368 725/63 |
| 2015/0036740 | A1 | 2/2015 | Yang et al. | |
| 2016/0295216 | A1 | 10/2016 | Aaron et al. | |
| 2018/0063549 | A1 | 3/2018 | Amer et al. | |
| 2018/0160161 | A1 | 6/2018 | Reznik et al. | |
| 2018/0242002 | A1 | 8/2018 | Katsavounidis | |
| 2018/0242015 | A1* | 8/2018 | Katsavounidis | H04L 65/4084 |
| 2019/0028745 | A1 | 1/2019 | Katsavounidis | |
| 2019/0289296 | A1* | 9/2019 | Kottke | H04N 19/179 |

OTHER PUBLICATIONS

Vanam et al., H.264/MPEG-4 AVC Encoder Parameter Selection Algorithms for Complexity Distortion Tradeoff, Proceedings of the Data Compression Conference, Mar. 2009, 11 Pages.

U.S. Office Action dated Jul. 1, 2019 issued in U.S. Appl. No. 15/981,517.

U.S. Final Office Action dated Oct. 22, 2019 issued in U.S. Appl. No. 15/981,517.

U.S. Notice of Allowance dated Jan. 21, 2020 issued in U.S. Appl. No. 15/981,517.

U.S. Notice of Allowance dated Oct. 9, 2020 issued in U.S. Appl. No. 16/588,652.

U.S. Appl. No. 16/817,129, filed Mar. 12, 2020, Wei et al.

U.S. Notice of Allowance dated Dec. 11, 2020 issued in U.S. Appl. No. 16/817,129.

* cited by examiner

CONTENT DELIVERY OF LIVE STREAMS WITH PLAYBACK-CONDITIONS-ADAPTIVE ENCODING

INCORPORATION BY REFERENCE

An Application Data Sheet is filed concurrently with this specification as part of this application. Each application to which this application claims benefit or priority as identified in the concurrently filed Application Data Sheet is incorporated by reference herein in its entirety and for all purposes.

BACKGROUND

Streaming video services encode source content into various resolution and bit rate levels. These various resolution and bit rate levels allow the streaming video service to tailor video streams to a customer's playback device capability and bandwidth availability. On the client side, software running on the playback device adaptively switches between resolution and bit rate levels according to algorithms that manage the video quality and playback experience.

For a streaming video service with a large media content catalog having diverse content characteristics and facing ever-changing playback conditions, determining the specific set of available resolution and bit rate levels for optimizing the customer experience remains a challenge. As an example, determining the optimal set of available resolution and bit rate levels is a challenge when playback conditions such as network capacity, bandwidth availability, network latency, number of simultaneously streaming client devices, distributions of display sizes of the client devices, and other playback conditions dynamically vary.

Furthermore, for a given resolution and bit rate level, automated and efficient determination of the values for encoding parameters is also a challenge. This challenge is increased in the context of codecs with numerous encoding parameters (e.g., 30-50), such as, for example, the Advanced Video Coding (AVC), High-Efficiency Video Coding (HEVC), and AOMedia Video 1 (AV1) codecs. Specifically, such codecs utilize encoding profiles having numerous encoding parameters, such as quantization parameters, block size parameters, adaptive encoding optimization parameters, and so forth, with each encoding parameter having either direct or indirect impact on encoding bit rate and quality. To address these challenges, streaming video services have conventionally relied on human subject matter experts to perform trial and error analysis on a limited dataset to determine a set of encoding profiles (also referred to as encoding ladders). While streaming video services have replaced certain manual processes by using computational modules for search/optimization processes, they have typically been limited to one or two encoding parameters, such as, for example, a quantization parameter or constant rate factor.

Streaming services that provide live streams face additional challenges because of the real-time nature of the content. As an example, a streaming service providing live content with available resolution and bit rate levels optimized for client devices having relatively small screens (e.g., smartphones, tablets, etc.) would be ill-configured if the most of the streaming client devices were actually client devices having relatively large screens (e.g., desktop computers, laptops, and televisions or set-top boxes). As another example, a streaming service providing live content cannot use conventional human subject matter experts to perform trial and error analysis, since the live content must be encoded and transmitted out in near real time. As a result, a streaming service providing live content typically uses generic encoder parameter settings that are shared for all live content. Because content (whether live or recorded) can vary widely (e.g., a sports event may have lots of visual motion and a low priority on audio quality, while a live concert may have little visual motion but a high priority on audio quality), the use of generic encoder parameter settings for live content often results in sub-optimal live streaming performance (e.g., excessive bandwidth use, excessive loss of quality, etc.). Moreover, because playback conditions such as network conditions and the mix of client devices can change over the course of a live stream, the use of encoder parameters that are not adaptive to changes in playback conditions often results in sub-optimal live streaming performance.

DETAILED DESCRIPTION

Figure 1:
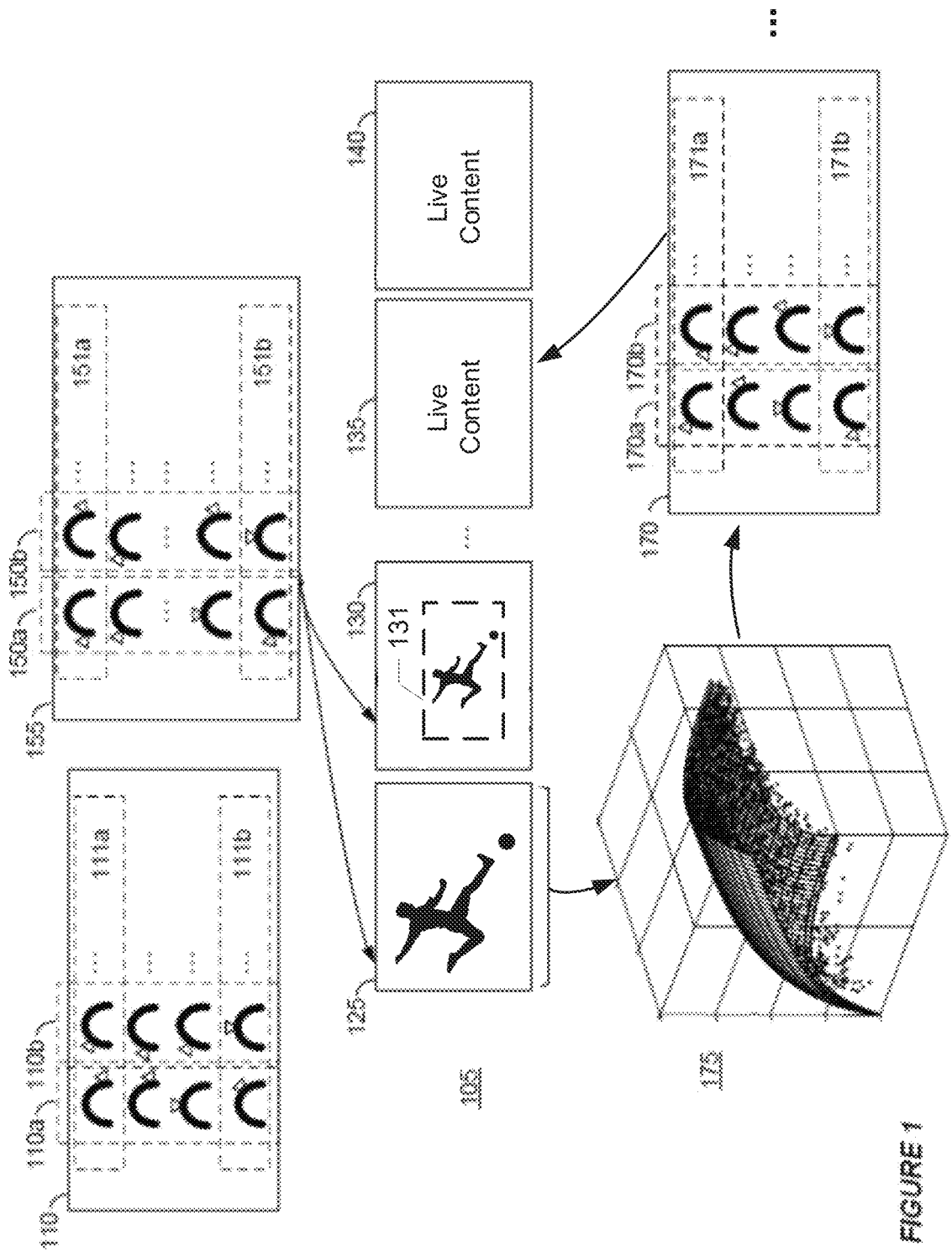
FIG. 1 illustrates an example of optimizing live content encoding ladders.

This disclosure describes techniques for dynamically adjusting live streaming video encoding profiles based on changing playback conditions. Optimization of multiple sets of streaming video encoding profiles (referred to herein as an encoding ladders) to accommodate dynamically changing playback conditions, includes sampling of previously-live video content and playback conditions, prioritization of encoding parameters, rate-quality data sampling of an encoding parameter and playback conditions combination space, data space pruning, and optimizing cost functions based on system constraints. As an example, the set of streaming video encoding profiles optimized for a given category of live content may include subsets of streaming video encoding profiles, each of which is optimized for a respective set of playback conditions. A video encoding profile optimized for a given set of playback conditions may be referred to herein as a playback-conditions-adapted encoding profile.

Potential sets of playback conditions include, but are not limited to, a small-screen-dominated condition, a large-screen-dominated condition, a cellular-dominated-condition, a congested bandwidth condition, and a non-congested bandwidth condition. As an example, the congested bandwidth condition may be a condition in which the unused bandwidth (e.g., the available bandwidth, which may equal the total bandwidth less the bandwidth currently utilized for streaming) falls below a threshold limit. In the congested bandwidth condition, the live streaming service may switch to an encoding ladder that has a lower maximum resolution (e.g., a 4 k resolution option may be dropped) and/or an encoding ladder than has lower bitrates for the same resolutions as a prior encoding ladder. The small-screen-dominated condition may, as an example, be a condition in which more than a threshold fraction of client playback devices are mobile devices having relatively small screens and/or lower resolutions. When the small-screen-dominated condition exists, it may be desirable to utilize an encoding ladder focusing on lower resolutions and bitrates. The large-screen-dominated condition may, as an example, be a condition in which more than a threshold fraction of client playback devices are devices such as televisions or television set top boxes devices having relatively large screens and/or higher resolutions. When the large-screen-dominated condition exists, it may be desirable to utilize an encoding ladder focusing on higher resolutions and bitrates. As a specific example, the small-screen-dominated condition may be present when more than a certain fraction (e.g., 25%, 35%, 50%, 65%, or 75%) of the client devices have screen sizes typical for mobile devices such as tablets and smartphones (e.g., screen sizes less than approximately 20 inches, less than approximately 15 inches, less than approximately 13 inches, less than approximately 10 inches, or less than approximately 8 inches). As another specific example, the large-screen-dominated condition may be present when more than a certain fraction (e.g., 25%, 35%, 50%, 65%, or 75%) of the client devices are television set-top boxes, smart televisions, or the like that are generally associated with larger screen sizes (e.g., screen sizes greater than approximately 10 inches, greater than approximately 20 inches, greater than approximately 25 inches, or greater than approximately 30 inches). Additional playback condition categories may exist, such as medium-screen-dominated conditions (e.g., when client devices have a minimum fraction of devices such as laptop computers with intermediately sized screens) and as extra-large-screen-dominated or super-resolution-screen-dominated conditions (e.g., when client devices include a minimum fraction of devices with extra large screen sizes, such as screen sizes above 50", supporting higher resolutions such as 4K or 8K, and/or supporting higher formats such as HDR). As a further example, the cellular-dominated-condition may exist when more than a certain fraction of the client devices are relying upon a cellular network connection (e.g., when a certain fraction of the client devices have network connections that are expensive, relatively slow, and/or unreliable).

As another example, each set of streaming video encoding profiles may be optimized for a respective category of live content. A video encoding profile optimized for a given category of live content (e.g., events of the given category, which may be any desirable category of live content) may be referred to herein as an event-adapted encoding profile. Event-adapted encoding profiles are described in U.S. patent application Ser. No. 16/588,652 filed Sep. 30, 2019, which is incorporated herein by reference in its entirety. Potential categories of live content include, but are not limited to, sports content (e.g., sports content generally or in a more specific category such as a particular sport, a particular league, a particular team, a regular season game, a playoff game, a championship game, etc. and including any sports-like activities including traditional sports like soccer and football as well as other sports such as motorsports and e-sports events), arts and entertainment content (e.g., indoor and outdoor concerts, musicals, live variety shows, etc.), business content (e.g., business news reports, online auction broadcasts, etc.), music content (e.g., music video), newscast content, political content, science content, spiritual content, live broadcasts using fixed or stationary cameras, live broadcasts using mobile cameras, etc.

Categories may be broken down into one or more levels of sub-categories (e.g., a sports content category may include a soccer sub-category, which may in turn include a Premier League sub-category, which may in turn include an Arsenal sub-category). Distinguishing between live content based on categories may also be referred to herein as content-based categorization. Optimized sets of streaming video encoding profiles may be generated for such sub-categories.

The techniques can be applied to any type of live event, are codec-agnostic, and can be applied to a scalable number of encoding parameters, rather than being limited to one or two encoding parameters. An example will be instructive.

FIG. 1 illustrates an example of encoding live and formerly-live media content with optimized encoding ladders (i.e., sets of encoding profiles tailored to dynamic playback conditions and/or tailored to the characteristics of the media content being encoded). In FIG. 1, media content 105 includes video presentations or titles 125, 130, 135, and 140, with at least one of the video presentations occur under different playback conditions. For example, video presentations 125 and 130 are a formerly live soccer game (e.g., content having a high proportion of scenes involving motion and moving backgrounds, such as panning shots of running players). Video presentation 125 occurs under a first set of playback conditions (e.g., a large-screen-dominated condition), while video presentation 130 occurs under a second set of playback conditions (e.g., a small-screen-dominated condition as indicated at least by dashed lines 131). Video presentations 135 and 140 are other live events that have not yet occurred (e.g., future live events of the same or a different content category and/or future live events occurring under similar or different playback conditions).

FIG. 1 depicts default encoding ladder 110 with four "rungs," each rung corresponding to a particular encoding profile (i.e., a particular set of encoding parameter values for, among other things, various resolutions and bitrates). Encoding ladders allow delivery of a range of viewing experiences to users connecting with different devices over varying bandwidths. A particular encoding ladder is configured to make tradeoffs between resources consumed during the encoding/decoding process (e.g., processing time, bandwidth, storage, etc.) and visual quality.

In FIG. 1, each encoding profile in encoding ladder 110 (e.g., profiles 111a and 111b) includes an encoding parameter 110a. Encoding parameter 110a corresponds to image resolution, and can take on the four values of UHD, 1080p, 720p, and 576, with each encoding profile in default encoding ladder 110 corresponding to a different image resolution value. FIG. 1 also depicts that each encoding profile in ladder 110 has an encoding parameter 110b. Encoding parameter 110b corresponds to a quantization parameter, which represents a factor applied to residual coefficients that indicate differences in image content between different portions, or coding units, of an image frame to scale down the residual coefficients as a compression technique. Encoding parameter 110b can have a range of values, such as, for example, from 0-51. In FIG. 1, encoding profile 111a (corresponding to the UHD resolution) has a low quantization parameter value that results in less compression and higher quality, and encoding profile 111b (corresponding to the 576i resolution) has a high quantization parameter value that results in more compression and lower quality.

In some scenarios, default live stream encoding ladder 110 corresponds to an encoding ladder that is applied to media content 105 irrespective of the characteristics of media content 105 and the current playback conditions (e.g., what kinds of client devices are streaming, how much network bandwidth is available, and/or what kind of live event the media is and the typical encoding complexity of that kind of live event). That is, default encoding ladder 110 is applied to video presentations 125, 130, and other video presentations in media content 105, resulting in each of the video presentations in media content 105 being encoded as multiple representations corresponding to each of the encoding profiles in default encoding ladder 110.

However, a default live stream encoding ladder may not be well-suited for all playback conditions and/or for all categories of live content. For example, a particular value for an encoding parameter setting such as the quantization parameter may provide a high-quality encoding of live events displayed on televisions. However, that same value for the quantization parameter may result in excessive bandwidth consumption when the vast majority of client devices streaming the event are mobile devices with small screens (e.g., when higher quality encodings are effectively indistinguishable from lower quality encodings, due to the reduced screen size). Therefore, if the default encoding ladder is tailored to a first set of playback conditions (such as small-screen-dominated conditions), live content having different playback conditions (such as large-screen-dominated conditions) may be encoded with sub-optimal quality and/or result in excessive bitrates.

In FIG. 1, rather than using default encoding ladder 110, a plurality of adaptive live streaming encoding ladders 170 can be determined based on trial encodings of samplings of formerly-live content from media content 105. Each of the adaptive live streaming encoding ladders 170 may be optimized for a set of playback conditions. In some embodiments, each of the adaptive live streaming encoding ladders 170 is optimized for a different combination of playback conditions and content category, or sub-category, of live content. As examples, a first ladder 170 can be optimized for playback conditions including large-screen-dominated conditions and for content within a sports content category, while a second ladder 170 is optimized for small-screen-dominated playback conditions and the same sports content category and while additional ladders 170 are optimized for various sets of playback conditions and for a concert content category).

In FIG. 1, trial live encoding profiles 155 can be used to encode formerly-live video presentations 125 and 130. The values for the encoding parameters in each encoding profile contained in trial encoding profiles 155 (portrayed as gauges being dialed to different values) may span a wide range to account for the different possible playback conditions and/or the different possible characteristics of the video presentations in media content 105 (including formerly-live presentations 125 and 135 and future live events such as presentations 135 and 140).

For example, for encoding profile 151a in trial encoding profiles 155, since video presentation 125 (or future similar live events such as presentation 135) is or was streamed under a first set of playback conditions (e.g., a mix of client devices that includes a relatively large number of devices with fast network connections and large screens), a higher value for encoding parameter 150b, which corresponds to a constant rate factor, results in a point in data space 175 (e.g., a data space associated with trial encodings of presentation 125) representing a high quality and high bit rate encoding appropriate for devices with large screens and fast network connections. If desired, data space 175 may include data points generated with trial encodings of multiple other pieces of content (which may be content pieces having similar content characteristics and/or content pieces streamed under similar playback conditions as presentation 125) in media content 105.

By contrast, the same encoding profile 151a used to encode video presentation 130 (or future similar live events such as presentation 140), which is or was streamed under a second set of playback conditions (e.g., a mix of client devices that includes a relatively large number of devices with slow or intermittent network connections and small screens), may be poorly optimized for the playback conditions associated with video presentation 130, based on the high value for encoding parameter 150b. In particular, a high constant rate factor in the playback conditions of presentation 130 would result in excessive encoded bitrates that the client devices would struggle to stream over their slow or intermittent network connections and where the additional quality provided by the high constant rate factor is imperceptible to users given the relatively small screens of the client devices. If desired, the data space associated with the trial encodings of presentation 130 may include data points generated with trial encodings of multiple other pieces of content (which may be content pieces having similar content characteristics and/or content pieces streamed under similar playback conditions as presentation 130) in media content 105.

As a result of encoding previously live samples under one or more sets of playback conditions of a common type of content from media content 105 using each of the encoding profiles in the trial encoding profiles 155, numerous points are generated in data space 175 (and corresponding data spaces associated with other types of content). For example, for trial encoding profiles 155 having 100 different encoding profiles, under 10 different sets of playback conditions, and 10 samples of sports events from media content 105, 100× 10×10=10,000 points are generated in a data space 175, which is associated with the sampled sports events and sampled playback conditions).

The generated set of points in a data space 175 for each set of playback conditions and/or category or sub-category of live event (e.g., sports events, football games, soccer games, scheduled newscasts, concerts, breaking news events, etc.) are pruned and used as inputs to an optimization function to determine adaptive live encoding ladders 170, where each adaptive live encoding ladder 170 is associated with a set of playback conditions and/or a particular type or category of live event. For example and in the context of a single adaptive live encoding ladder 170, points that correspond to quality values below a threshold are pruned. Similarly, points that correspond to encoding runtimes that exceed a threshold are pruned. Excessive encoding runtimes may be particularly troublesome for streaming of live content, and thus the limits on encoding runtimes may be lower than corresponding encoding runtime limits for recorded content. A performance boundary curve is generated based on the pruned points in data space 175. An optimization function is then applied to the pruned points in data space 175 to satisfy a constraint function relative to the performance boundary curve. For example, a predetermined number of points, such as four, are selected from the pruned points in order to maximize the volume covered in data space 175 under the performance boundary curve. Each of these four points corresponds to a particular encoding profile, and the set of four points identify the encoding profiles to include in a particular adaptive encoding ladder 170 (e.g., a ladder 170 configured for a particular set of playback conditions and/or a particular type of live event). The disclosed technique for determining adaptive encoding ladders 170 allows for live stream encoding ladders that are each tailored to the characteristics of a respective set of playback conditions and/or that are tailors to the characteristics of their respective live event types (e.g., content types), based on sampled playback conditions and based on sampled formerly-live content from media content 105. The adaptive encoding ladders 170 provide better compression and/or better video quality for the particular playback conditions, allowing for dynamic selection of adaptive encoding ladders 170 as playback conditions change. The adaptive encoding ladders 170 may also be adapted to the particular characteristics of the video presentations in media content 105, than would otherwise result from the use of a generic encoding ladder such as encoding ladder 110.

As shown in FIG. 1, the adaptive encoding ladders 170 may then be used during live streaming of future live events having playback conditions similar to those sampled and/or simulated while generating the adaptive encoding ladders 170. As an example, the adaptive encoding ladders 170 may be used in the real-time encoding of live content 135 and, as playback conditions change during the real-time encoding of live content 135, different adaptive encoding ladders 170 can be employed to match the changing playback conditions. As indicated by the ellipsis, additional adaptive live encoding ladders, each associated with another set of playback conditions and/or another type or category of live content, may be determined using samples and/or simulations various sets of playback conditions and samples of one or more past events of that type or category.

Figure 2:
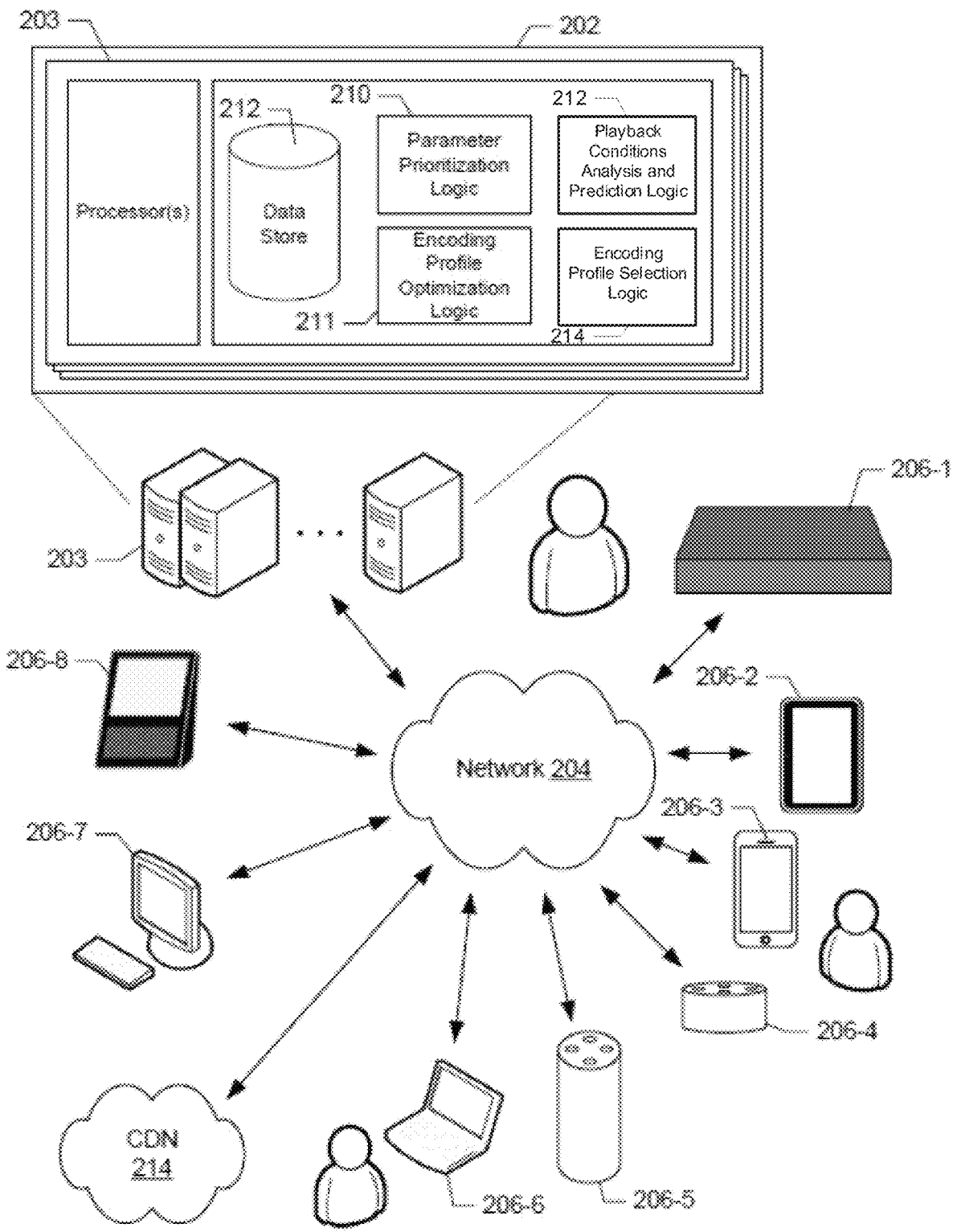
FIG. 2 illustrates an example of a computing environment for optimizing live content encoding ladders.

FIG. 2 illustrates an example of a computing environment in which live content may be adaptively encoded for transmission via network 204 to a variety of client devices (206-1 through 206-8) in accordance with the techniques described herein. Service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and generating and/or consuming content streams. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), internet-connected cameras, voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to encoding parameter prioritization logic 210, encoding profile optimization logic 211, playback conditions analysis and prediction logic 212, and encoding profile selection logic 214, service 202 may include other types of logic (not shown) involved in the delivery of content as part of a video-on-demand service or a live/broadcast video service. Playback conditions analysis and prediction logic 212 may, as an example, be configured to monitor and analyze dynamically changing playback conditions and to predict near-future changes in playback conditions. Encoding profile selection logic 214 may, as an example, be configured to select which encoding profile to utilize for an ongoing live-stream, based on the output of logic 212.

In addition to adaptively encoding live video content according to dynamically changing playback conditions and/or the type of content (e.g., football game, soccer game, baseball game, newscast, concert, etc.) and providing access to video streams, service 202 may also include a variety of information related to the video content (e.g., other associated metadata and manifests in data store 212 which service 202 uses, or to which service 202 provides access). Data store 212 may also include data representing cost functions, constraints, historical information, machine learning models and encoding profiles implemented and generated as described herein. Alternatively, any of this information may be provided and/or hosted by one or more separate platforms, e.g., content delivery network (CDN) 214 or other third-party platform. It should be noted that, while data store 212 and logic 210, 211, 212, and 214 are shown as integrated with service 202, implementations are contemplated in which some or all of these operate remotely from the associated service, and/or are under the control of an independent entity. Those of skill in the art will understand the diversity of use cases to which the techniques described herein are applicable.

Figure 3:
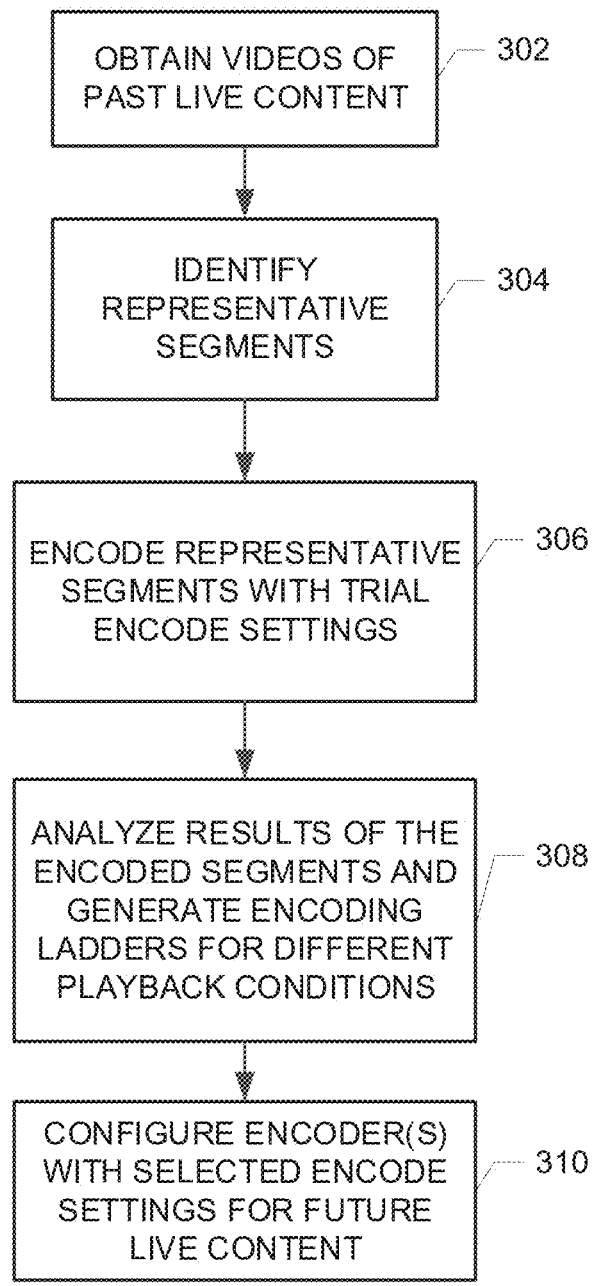
FIG. 3 is a flowchart illustrating processes for determining playback-conditions-adaptive encoding ladders.

FIG. 3 illustrates a flowchart for generating a playback-conditions-adaptive encoding ladder for live content. Playback-conditions-adaptive encoding ladders may also be referred to as playback-condition-optimized encoding ladders (e.g., encoding ladders optimized for a particular set of playback conditions including, but not limited to, large-screen-dominated conditions, small-screen-dominated conditions, mixed-screen-size conditions, conditions where client devices have unreliable or slow network connections, congested network conditions, or high latency network conditions).

In a class of implementations, generating a playback-conditions-adaptive encoding ladder for a given set of playback conditions includes obtaining examples of prior playback conditions or simulating potential playback conditions for performing trial encodes to generate points for a data space. When the playback-conditions-adaptive encoding ladder are also event-adapted, obtaining video samples of past live content (302) includes obtaining video samples of past live content with a common event content category. Referring to FIG. 1, media content 105 contains multiple video presentations. For clarity purposes, FIG. 1 depicts four video presentations, though it should be appreciated that media content 105 contains more than the four depicted video presentations. Furthermore, FIG. 1 depicts that the video presentation 125 is included in the samples of media content 105 that are encoded using trial encoding profiles for a particular set of playback conditions (and optically for a particular category of live events). It should further be appreciated that the number of samples of media content 105 can include more than the four video presentations shown in FIG. 1 and that samples of multiple formerly-live events of a similar playback conditions may be used in generating a playback-conditions-adaptive encoding ladder for that set of playback conditions.

The video presentations included in the samples (obtained in 302) may be selected from a subset of media content 105 representative of the playback conditions for which a playback-conditions-adaptive encoding ladder is being generated. For example, media content 105 may contain thousands of video presentations of a Premier League soccer games that had similar playback conditions (e.g., large-screen-dominated conditions), whereas only a few dozen or a few hundred are selected as samples for performing trial encodings when creating a large-screen-adapted encoding ladder due to computation time limitations. In such an example, the large-screen-adapted encoding ladder may also be an event-adapted encoding ladder (e.g., the encoding ladder may also be adapted for Premier League soccer games).

Generating the playback-conditions-adaptive encoding ladder for live content may further include identifying (304) representative segments of the video samples. In some implementations, only the representative segments of the video samples are used in generating a playback-conditions-adaptive encoding ladder (which helps reduce the computation time required to generate the encoding ladder). Identifying representative segments (304) may involve a complexity-based sampling of the video samples obtained (in 302). As an example, the time-varying encoding complexity (e.g., the encoded bitrate as a function of time within the video) of each video sample may be determined and analyzed. For each video sample, segments of that sample may be selected, where the selected segments are representative of the encoding complexity of the video sample as a whole. As a particular example, if a given video sample is made up of about three-quarters of video with a relatively-high encoding complexity and one-quarter of video with a relatively-low encoding complexity, 9 segments with a relatively-high encoding complexity and 3 segments with a relatively-low encoding complexity may be extracted from the video sample, where the segments have a common length, such that the segments as a group (¼ low encoding complexity, ¾ low encoding complexity) are representative of the encoding complexity of the video sample overall (¼ low encoding complexity, ¾ low encoding complexity). In some implementations, the selected segments may be selected to have an overall encoding complexity that approximately matches (e.g., to within 5%) the overall encoding complexity of the video sample from which those segments were selected.

In another class of implementations, identifying (304) representative segments of a particular video sample may involve analyzing the time-varying encoding complexity of that video sample and selecting segments within the sample video having relatively high encoding complexity as the representative segments. As a particular example, a video sample may be broken up into segments of a common length, those segments encoded with a constant-quality constraint, and each of those encoded segments may be ranked by encoding complexity. Then, some fraction (e.g., 3%, 5%, 8%, 10%, 12%, 15%, 20%, etc.) of the segments having the highest encoding complexity may be selected as the representative segments. This type of approach, selecting the segments with the highest encoding complexity, may be a relatively conservative approach, in that it may ensure a minimum video quality for even the most complex scenes. Other approaches may also be implemented. As an example, the segments having an encoding complexity in the middle of the encoding complexity distribution may be selected (e.g., the segments having an encoding complexity greater than 45% of the other segments, while also having an encoding complexity less than 45% of the other segments). As another example, the segments having an encoding complexity near the bottom of the encoding complexity distribution may be selected (e.g., the segments having an encoding complexity less than 95%, 90%, etc. of the other segments).

In a class of implementations, the playback-conditions-adaptive encoding ladder optimization includes encoding the representative segments with trial encode settings (306). The trial encode settings may be those of trial encoding profiles 155, as an example. Encoding the representative segments with trial encode settings may include data point generation for a multidimensional data space. Examples of dimensions of the data space include any combination of playback conditions such as the number of concurrently streaming client devices 206, one or more properties of the client devices 206 (e.g., screen sizes, resolutions, network latency, network bandwidth, geographic distribution of the client devices, playback limitations of the client devices), one or more properties of the streaming service (e.g., available computational resources, network latency, and network bandwidth). The data space may additionally include any combination of dimensions such as bit rate, quality, and encoding runtime. It should be appreciated that the dimensions of the data space may correspond to system constraints for the design of a live video streaming service.

The trial encode settings can span a wide range of content encoding parameters. Examples of encoding parameters include but are not limited to one or more of a Group Of Pictures (GOP) structure, entropy coding mode (Context-adaptive binary arithmetic coding (CABAC)/Context-adaptive variable-length coding (CAVLC)), number of reference frames, interlace coding support, motion search range, motion search algorithm, intra/inter encoding partition size, intra/inter encoding partition size mode decision, intra prediction mode decision, Picture-adaptive frame-field coding (PAFF) decisions, Macroblock-adaptive frame-field (MBAFF) coding decisions, macro block (MB) level quantization parameters, deblocking filter strength, quantization scaling matrices, quantization rounding offsets, Lagrangian multipliers for rate-distortion (RD) optimization, various thresholds to bias mode decision, adaptive-quantization mode, adaptive-quantization strength, constant rate factor, inter noise reduction level, quantization group size, sub-pixel motion estimation method, quantization approach, discrete cosine transform (DCT) size, the use of mixed references, and so forth.

It should be appreciated that an optimal encoding profile for a single video sample under a single set of playback conditions (i.e., set of encoding parameter values resulting in the least encode time per frame, the lowest bit rate, and the highest quality, such as a PSNR of the luma component)

can be found by encoding the video sample over all possible encoding parameter values. However, an exhaustive search is time consuming.

For example, using the open source x264 encoder for the H.264 standard, trial encoding profiles 155 in FIG. 1 (and the trial encode settings of process 306) can include different values for encoding parameters including but not limited to adaptive-quantization mode (aq-mode parameter), the number of reference frames (ref parameter), the sub-pixel motion estimation method (subme parameter), the partition size for intra and inter motion compensation (part parameter), and the quantization approach (trellis parameter).

Adaptive quantization varies the quantizer for each individual macroblock within each frame to avoid blur/blocking in flat areas containing fine/edge detail, such as calm water, sky and animation. The aq-mode encoding parameter can correspond to the values of 0: Do not use (adaptive quantization) AQ at all, 1: Allow AQ to redistribute bits across the whole video and within frames, or 2: Auto-variance AQ which attempts to adapt AQ strength per-frame.

The subme encoding parameter can be 7 different values relating to the number of iterations for motion estimation.

The ref encoding parameter can be 16 different values specifying from one to a maximum of 16 reference frames.

The part encoding parameter can be 10 different values that specify the partition size for intra (I), predictive (P) and bi-predictive (B) macroblocks.

The trellis parameter can be 4 different values that include uniform quantization with and without context adaptive arithmetic coding (CABAC), and other options for finding the quantization for a block of DCT coefficients.

Exhaustive searching over the possible values for these example encoding parameters requires 13,440 encodings for a video sample (3×7×16×10×4). It should be appreciated that additional x264 encoding parameters (e.g., the DCT size (dct), the motion estimation method (me), the motion search method (ms), the use of mixed reference (mixed-refs), etc.), each having their own range of possible values, further increases the number of permutations for an exhaustive search. Moreover, the number of encodings to perform further involves multiplication by the number of video samples.

To address the time-consuming nature of an exhaustive search for desirable encoding parameters, encoding the representative segments with trial encoding settings (306) may include, in a class of implementations, encoding parameter prioritization. Instead of relying on an exhaustive search, a limited set of encoding profiles is selected for trial encoding profiles 155. Continuing the previous example, a limited set of encoding profiles out of the 13,440 possible permutations for the 5 example encoding parameters discussed above is selected. For instance, trial encoding profiles 155 includes encoding profiles that use each of the three possible values for adaptive quantization. In contrast, for the subme encoding parameter which has 7 options, trial encoding profiles 155 only includes two of the seven options. For the ref encoding parameter corresponding to the number of reference frames, 4 of the 16 different available values, such as 1, 6, 11, and 16 reference frames, are included in trial encoding profiles 155. For the part encoding parameter, the original 10 different values that specify the partition size for intra (I), predictive (P) and bi-predictive (B) macroblocks are included in trial encoding profiles 155. However, for the trellis parameter, only one option, such as uniform quantization with context adaptive arithmetic coding, is included in trial encoding profiles 155.

For the given example, a search over all possible values for trial encoding profiles 155 involves 240 encodings for a video sample (3×2×4×10×1), which is significantly fewer than the 13,440 total possible permutations prior to encoding parameter prioritization. It should be appreciated that for adaptive encoding ladder determination, the example of 240 permutations can be multiplied by the range of values for other encoding parameters in a particular encoding profile, such as multiplying by four for the scenario where each video sample can take on the image resolution values of UHD, 1080p, 720p, or 576i, and may also need to be multiplied by the number of video samples.

It should be noted in the example that the range of values used in trial encoding profiles 155 was not reduced for encoding parameters such as adaptive quantization (3 values) and the partition size encoding parameter (10 values). However, the range of values for other encoding parameters are reduced, such as for the subme encoding parameter (from 7 to 2), for the ref encoding parameter (from 16 to 4), and for the trellis parameter from (4 to 1). The analysis of which encoding parameters to reduce the range of values for, and the extent to reduce the range of values by, is performed during an encoding parameter prioritization process.

In an encoding parameter prioritization process (which may be part of encoding representative segments (306)), encoding parameters can be assigned a particular value, such as a priority value. The relative priority values between encoding parameters reflects whether the possible range of values for the encoding parameter is reduced in the limited number of encoding profiles in trial encoding profiles 155.

As an example, the adaptive quantization mode is assigned a high priority value, and therefore there is no reduction in the possible range of values for adaptive quantization in trial encoding profiles 155. In other words, the trial encoding profiles 155 results in testing all 3 possible values for adaptive quantization mode.

As another example, the ref encoding parameter is assigned a priority level that is lower than the adaptive quantization mode priority level, indicating there is a reduction in the possible range of values for the number of reference frames in trial encoding profiles 155, specifically from 16 possible values to 4 possible values.

As a further example, the trellis encoding parameter is assigned a priority level that is lower than the ref encoding parameter priority level, indicating there is an even greater reduction in the possible range of values for the quantization approach encoding parameter in trial encoding profiles 155, specifically from 4 possible values to 1 possible value.

By performing encoding parameter prioritization, the limited number of encoding profiles in trial encoding profiles 155 are selected to represent optimal coverage of a data space that encompasses all of the sets of values of encoding parameters represented by the overall possible permutation of encoding profiles. Examples of dimensions of the data space include a combination of playback conditions, bit rate, quality, and encoding runtime. Ensuring that the limited number of encoding profiles provides broad coverage of the data space contributes to greater computational efficiency (i.e., fewer redundant trial encoding outputs that provide insignificant variation along dimensions in the optimization data space), and a more accurate estimation of a performance boundary curve. In some implementations, the performance boundary curve is used for a multidimensional optimization function to derive the particular encoding profiles for playback-conditions-adaptive encoding ladder 170.

For example, if the majority of encoding profiles in trial encoding profiles 155 correspond to numerous different values for encoding parameters with little impact on quality, bit rate, and encoding runtime, the encoding outputs will result in a tight cluster in data space 175. One example of an encoding parameter with low priority is the number of b frames. In turn, the estimated performance boundary curve derived from the tight cluster may not be an accurate representation of the true performance boundary curve that would be obtained through an exhaustive search. In contrast, if trial encoding profiles 155 results in encoding outputs in data space 175 that correspond to a wide range of quality, bit rate, and encoding runtimes, the estimated performance boundary curve may be a more accurate representation of the true performance boundary curve. Examples of encoding parameters with high priority include but are not limited to adaptive-quantization mode, adaptive-quantization strength, constant rate factor, inter noise reduction level, or quantization group size.

In a class of implementations, assigning priority values to encoding parameters includes obtaining video samples, performing a set of trial encodes, and clustering the trial encoding outputs using an unsupervised clustering technique. Any of a variety of clustering algorithms and associated models may be used such as, for example, a k-means clustering algorithm, an expectation-maximization clustering algorithm, a mean shift clustering algorithm, a hierarchical clustering algorithm, density-based clustering, grid-based clustering, as well as other clustering algorithms based on neural networks, etc. This clustering results in sets of encoding outputs. Because the set of encoding outputs associated with a cluster includes encoding profiles with identical values for certain encoding parameters, and different values for certain other encoding parameters, the extent to which a change in the value of an encoding parameter contributes to a trial encoding output being within a particular cluster or a different cluster can be determined.

For example, encoding parameters in which a change in value results in the corresponding trial encoding output being in a different cluster are associated with high priority values. By contrast, encoding parameters in which a change in value results in the corresponding trial encoding output being in the same cluster are associated with low priority values. Therefore, encoding parameters can be differentiated based on their impact on separating trial encoding outputs samples across clusters, and as a result, a priority level can be associated with certain encoding parameters.

In some implementations, encoding parameter prioritization can be predetermined in a one-time, off-line process. In certain implementations, the encoding parameter prioritization process can be performed as part of the generation of an adaptive encoding ladder. It should be appreciated that the encoding parameter prioritization process may use a set of video samples that is the same as the video samples being used to generate the adaptive encoding ladder, or the encoding parameter prioritization process may use a different set of video samples. It should further be appreciated that because the number of values that a particular encoding parameter can be assigned may vary, the priority level is not necessarily indicative of the number of values included in trial encoding profiles 155. For example, a high priority encoding parameter may have only two values, whereas a less significant encoding parameter may have a range of 16 different values.

In a class of implementations, the encoding parameter prioritization process can be used as a tie breaker. For example, when two different encoding profiles result in the same point or nearly the same point in data space 175, the encoding profile in which a higher priority encoding parameter is being varied will be retained, and the encoding profile in which a lower priority encoding parameter is being varied will be eliminated. This reduces the total number of trial encoding outputs to generate, and causes the generated trial encoding outputs to account for the higher priority encoding parameter.

In some implementations, the quality level for video played back to a customer of a video streaming service can be a design constraint, therefore the data space may include a video quality level dimension (e.g., a video quality of the trial encodings may be measured in analysis 308). In certain implementations, the quality level corresponds to a quality metric algorithm that compares the compressed video with a reference source and outputs a value that predicts how viewers would rate the quality of the compressed video. A person having ordinary skill in the art would recognize that the disclosed techniques are compatible with a wide range of quality metric algorithms, including the Peak Signal-to-noise Ratio (PSNR), Structural Similarity Index (SSIM), Video Multimethod Assessment Fusion (VMAF), etc. And different quality metrics may be used in the alternative or in various combinations to place the trial encodes in the multidimensional data space.

In certain implementations, the data space may also include a dimension for bit rate, such as kilobits per second (kbps). Such a dimension is indicative of the network bandwidth required for transmission of a segment of media content from a content delivery network edge server to a viewer device, and is also indicative of the viewer device content buffer requirements during playback of the downloaded segment of media content at the viewer device.

It should be appreciated that the data space may include dimensions that do not correspond to content playback characteristics. For example, one dimension in the data space may be encoding runtime, such as the amount of time to encode each frame in a particular video presentation. Such an attribute relates to the encoding process, rather than relating to decoding or playback at a viewer device.

Since the data space resulting from the trial encodings is multidimensional, each generated data point corresponds to a vector. It should be noted that each data space vector corresponds to the encoding parameter values vector for a particular encoding profile in the trial encoding profiles 155. A wide variety of techniques can be used to represent the data space vectors and the encoding parameter values vectors. For example, one point in data space 175 may be the data space vector {quality: 75, bit rate: 1950 kbps, encoding runtime per frame: 273 ms}. In some implementations, for a set of encoding parameters (such as the five parameters of aq-mode, subme, ref, part and trellis), with each parameter having n possible options, (such as n=3, 7, 16, 10, and 3, respectively, for the five example encoding parameters), an example of an encoder parameter values vector associated with the data space vector {quality: 75, bit rate: 1950 kbps, encoding runtime per frame: 273 ms} is the vector {2, 1, 2, 1, 3}, which specifies the x264 encoder for the H.264 standard with adaptive quantization mode enabled, the fastest sub-pixel motion estimation scheme; two reference frames; a partition size of P8×8; and the use of trellis algorithm for quantization and CABAC for entropy coding.

In a class of implementations, the encoding ladder optimization includes analyzing the results of the trial encodings (308). Analysis of the results may include data pruning based on constraints. As previously described, examples of dimensions of the data space include any combination of various playback conditions such as screen sizes and resolutions, network latency, network bandwidth, and client playback limitations as well as various dimensions such as bit rate, quality, encoding runtime, etc. Pruning of the points can be applied to particular dimensions of the data space. For example, pruning can be applied to ensure a minimum quality level by filtering out data points with a quality level below a threshold. As another example, pruning can be applied to remove data points with bit rates that exceed the network bandwidth available to client devices under a particular set of playback conditions (e.g., when playback conditions indicate that at least a threshold percentage or threshold number of client devices have bandwidth below an bandwidth threshold, data points with bitrates that exceed that bandwidth threshold may be pruned).

Figure 4A:
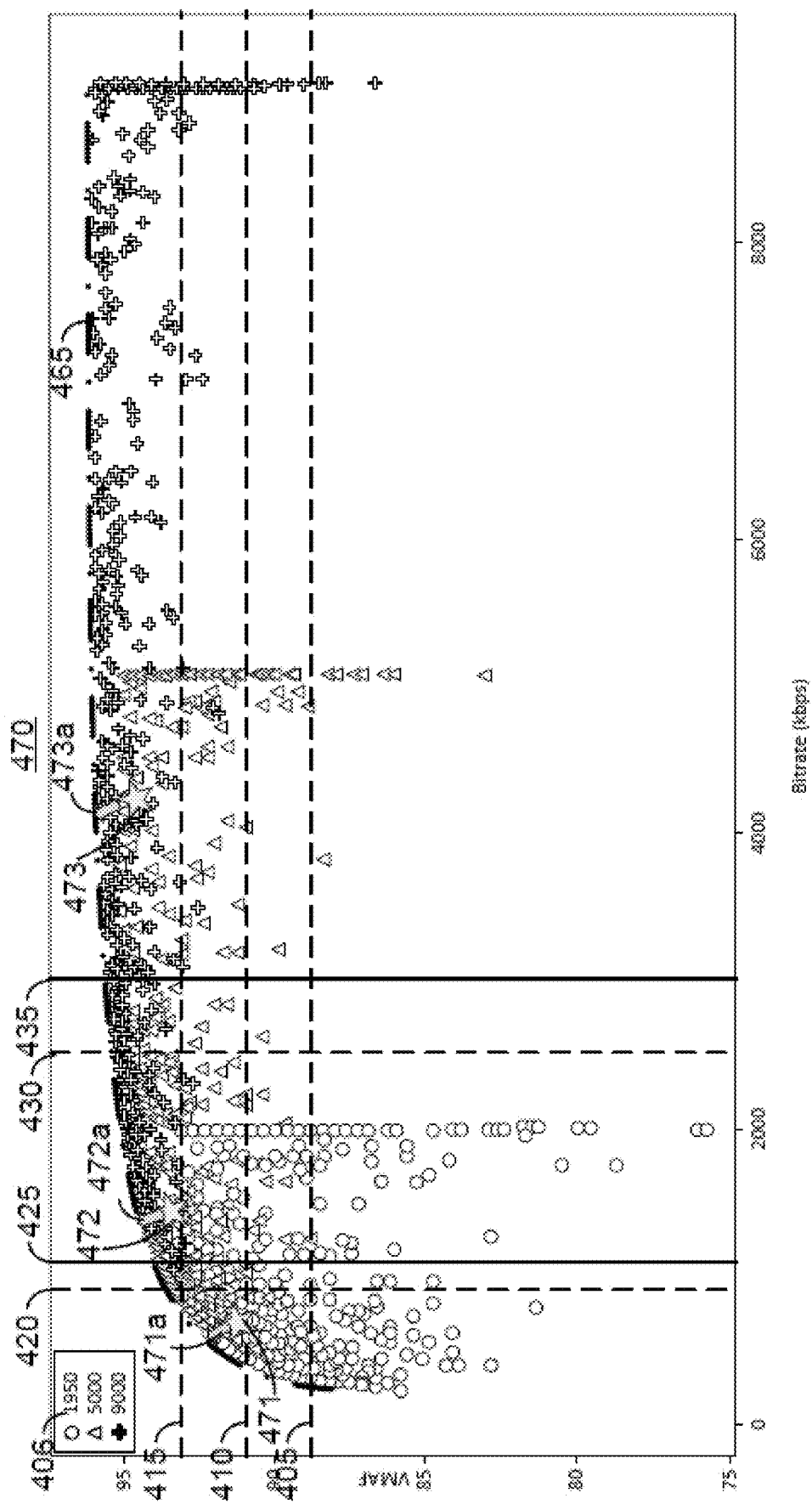
FIGS. 4A-B illustrates examples of data spaces for optimizing playback-conditions-adaptive encoding ladders.

For example, FIG. 4A illustrates a data space with two dimensions. It should be appreciated that the data space may be greater than two dimensions, but for clarity purposes, FIG. 4A only depicts a data space 470 with the dimensions of quality along the vertical axis using the VMAF quality metric, and actual bit rate along the horizontal axis in units of kbps. The VMAF quality metric is determined for each particular trial encoding output by, for example, comparing the compressed video with a reference source. The actual bit rate is determined by, for example, referencing log files generated during the encoding process, by dividing the file size by the duration of the video sample (e.g., number of frames divided by the frames per second), etc. It should further be appreciated that each dimension can be any of a wide variety of metrics/units other than quality or actual bit rate.

The encoding profiles corresponding to the points in FIG. 4A use three different maximum bit rate settings, specifically, 1950 (represented by the circle marks), 5000 (represented by the triangle marks), and 9000 (represented by the plus marks) maximum kbps, as indicated by the legend 406. For example, the circle marks in FIG. 4A depict the actual bit rates for the trial encoding outputs for all encoding profiles that include a value of 1950 for the maximum bit rate encoder parameter setting, as represented by the distribution of circle marks to the right of the 0 kbps and slightly to the left of the 2000 kbps horizontal axis ticks. These same circle marks also represent quality metric values (with higher values corresponding to higher quality for the VMAF quality metric), as represented by the range of values on the vertical axis between slightly above 75 to slightly below 94.

For the trial encoding outputs for all encoding profiles that include a value of 1950 for the maximum bit rate encoder parameter setting, the horizontal dashed line corresponding to threshold 405 represents a quality threshold. For example, all the circle marks below the threshold 405 are pruned, representing that circle marks with a VMAF quality metric level below about 88 are excluded as input points for determining an adaptive encoding ladder.

Figure 4B:
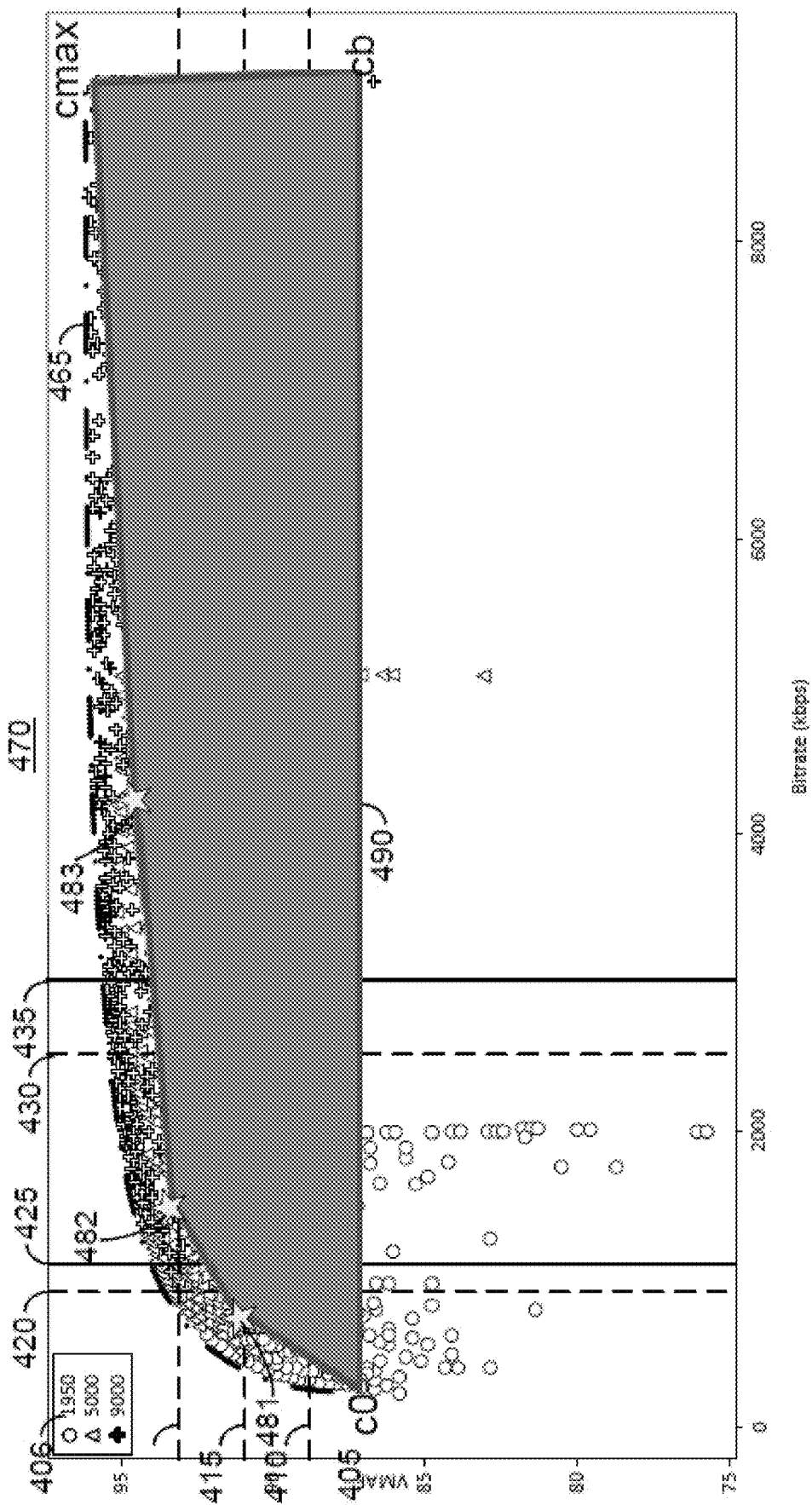

If desired, the trial encoding profiles may include trial encodes with more than (or less than) the three maximum bit rate settings illustrates in FIGS. 4A and 4B. In some implementations, an encoding parameter prioritization process of the type described herein may be used to determine how many values of the maximum bit rate setting should be tested in the trial encoding processes. In other words, the number of maximum bit rate settings that are tested may vary depending on how much the maximum bit rate setting affects encoding results of a particular set of samples within a quality-bitrate-runtime space, or within another multi-dimensional data space). The values for the maximum bit rate settings may be varied, although it may generally be desirable to have the maximum bit rate settings include a low-bit-rate option, a high-rate option, as well as a reasonable number of bitrate options therebetween.

In a class of implementations, pruning based on constraints can be applied to ensure a minimum separation along a particular dimension of the data space for different encoding profiles within an optimized encoding ladder. For example, the vertical dashed line corresponding to statistical measure 420 represents an average bit rate for the circle marks, and the vertical solid line corresponding to threshold 425 represents a bit rate that is 20% higher than the average bit rate of statistical measure 420. Triangle marks with an actual bit rate to the left of threshold 425 are excluded as input points for determining an adaptive encoding profile for the triangle marks (i.e., 5000 kbps maximum bit rate setting). In other words, for this example, threshold 425 is calculated using the trial encoding outputs for encoding profiles that include a value of 1950 for the maximum bit rate encoder parameter setting, and threshold 425 is being used to prune trial encoding outputs for encoding profiles that include a value of 5000 kbps for the maximum bit rate encoder parameter setting. Similarly, threshold 435 is set to 20% above the average bit rate for the triangle marks (i.e., 5000 kbps maximum bit rate setting), and threshold 435 is being used to prune trial encoding outputs for encoding profiles that include a value of 9000 kbps for the maximum bit rate encoder parameter setting. It should be appreciated that these examples of constraints (e.g., a margin of 20% greater than average bit rates) causes the set of encoding profiles in the adaptive encoding ladder to cover a wider range for a particular dimension (e.g., a wider range of bit rates) of the data space.

It should be noted that a value for a threshold may be independent of the value of encoding parameters. For example, all trial encoding outputs with an encoding runtime per frame exceeding a certain threshold are pruned, regardless of the value of the maximum bit rate encoding parameter, or the value of any other encoding parameter in the encoding profile.

Changing an encoding parameter value can simultaneously affect multiple data space dimensions, such as bitrate, encoding speed, and video quality. Thus, following the data space pruning process, the optimal selection of encoding parameter profiles, which may be part of analyzing the results of the trial encodings (308), for a playback-conditions-adaptive encoding ladder is a multi-dimensional optimization problem. The optimization involves accounting for tradeoffs along multiple dimensions (e.g., bitrate, encoding speed, and video quality) based on a cost function.

A cost function can be tailored to particular streaming video service system design goals. Cost function choices include but are not limited to (1) minimizing bit rate for a given quality constraint, (2) maximizing quality for a given bit rate constraint, (3) minimizing bit rate given quality and encoding runtime constraints, or (4) maximizing delivered quality (measured at the playback devices) given, for example, bit rate, network bandwidth, and playback device constraints and other playback conditions.

According to a particular implementation, the encoding profiles for a playback-conditions-adapted encoding ladder are generated using a cost function based on rate-distortion optimization. That is, the data points representing trial encodings of the video samples are distributed in two-dimensions (in which one dimension is bit rate and the other quality), or three-dimensions (adding the runtime dimension), or any n-dimensional space including bit rate and quality. For example, for the two-dimension case, the rate-distortion cost function determines points with the desired balance between bit rate and quality within the pruned data points. The encoding profiles corresponding to the points identified by the rate-distortion cost function include associated video frame resolutions. Based on particular video frame resolutions to provide to client devices, a particular encoding ladder can be selected. An example will be instructive.

FIG. 4A and FIG. 4B are illustrations of sample data spaces and sample cost function choices, which may be representative of results from encoding a single representative segment with trial encode settings (306), which may be used as part of analysis the trial encoding results (308) to generate playback-conditions-adaptive encoding ladders and then configuring (310) one or more live stream encoders with the playback-conditions-adaptive encoding ladders for future live streams. The sample data spaces of FIGS. 4A and 4B may represent non-pruned data spaces (e.g., there may be profiles having higher quality for less bandwidth than profile 471, but those profiles may be excluded and pruned for failing to meet other thresholds such as limits on encoding runtime that would make those profiles unsuitable for use in live streaming).

It should be noted that data space 470 of FIG. 4A and FIG. 4B can correspond to trial encoding outputs of a single video segment for an arbitrary range of different values for an arbitrary number of encoding parameters across n-dimensions, in contrast to a limited range of values for only one or two encoding parameters, such as a particular set of quantization parameter values (or constant rate factor values) mapped to a particular set of resolutions across 2-dimensions.

Analysis of the trial encoding results and generation of a playback-conditions-adaptive encoding ladder (308) may include performing a curve fitting operation to generate a curve equation representing a performance boundary curve. Referring to FIG. 4A, performance boundary curve 465, depicted by the dashed curve, is determined by fitting a curve equation to points corresponding to the peak quality (i.e., a maximum vertical axis value) achieved at the actual bit rates (i.e., a horizontal axis value) across all trial encoding outputs. For example, in FIG. 4A, for any chosen actual bit rate, the corresponding quality is below the performance boundary curve. The performance boundary curve is an abstraction of a best operating point set on which the highest quality that can be achieved at a particular actual bit rate across all the pruned permutations of encoding profiles in trial encoding profiles 155. It should be appreciated that the performance boundary curve can be generated based on the pruned data points in data space 470 using a variety of curve fitting techniques that minimize the distance between the performance boundary curve and the peak quality levels achieved at each actual bit rate. In the example of FIG. 4A, the curve fitting operation results in performance boundary curve 465 that corresponds to a convex contour, though in other implementations, the performance boundary curve may have different characteristics.

FIG. 4A and FIG. 4B illustrate two examples of how the performance boundary curve 465 can be used with different cost functions. It should be noted that while FIG. 4A and FIG. 4B illustrate different cost functions, both can utilize the same data space pruning process, and both can involve the same performance boundary curve. It should also be noted that two dimensions are shown in these figures for the sake of clarity, but that data spaces of higher dimensionality may be used. In particular, the additional dimension of encoding runtime may be important for implementations involving live content given the goal of reducing latency in this context. In particular, the encoding profiles in a multi-dimensional data space with encoding runtimes above a threshold (e.g., 2 seconds, 5 seconds, 10 seconds, etc.) may be excluded from consideration for use in live streaming, as such profiles would result in undesirable lag between the live content and the delivered live stream. If desired, pruning and selection based on encoding runtime may alternatively, or additionally, be based on the computational complexity encoding content with each encoding profile (e.g., since encoding runtime depends on both computational complexity and the computational resources deployed, it may be desirable to prune and select based on computational complexity directly).

FIG. 4A illustrates using a distance-based cost function to determine an optimal encoding ladder for a bitrate-quality data space of a single video segment. Specifically, three encoding profiles, profile 471, 472, and 473, are represented by the stars in FIG. 4A. Profile 471 is associated with the pruned trial encoding outputs for encoding profiles that include a value of 1950 for the maximum bit rate encoder parameter setting. Profile 472 similarly corresponds to the 5000 kbps maximum bit rate, and profile 473 similarly corresponds to the 9000 kbps maximum bit rate. In addition to optimizing the bitrate-quality trade-off within a particular maximum bit rate encoder parameter value, the distance-based cost function utilized in FIG. 4A may be configured to account for bit rate-quality trade-offs across the three maximum bit rate settings by minimizing the sum of the distances of the three star points illustrated by profile 471, 472, and 473 to performance boundary curve 465. The distance-based cost function jointly minimizes the aggregate distances (e.g., the sum of the three vectors 471a, 472a, and 473a that are perpendicular to performance boundary curve 465) and the per-maximum bit rate distances (e.g., the individual vectors 471a, 472a, and 473a that are perpendicular to performance boundary curve 465). For example, the cost function will select encoding profiles with distances for vectors 471a, 472a, and 473a that equal 1, 1, and 1, rather than encoding profiles with distances that equal 0.25, 0.25, and 2.5, even though both sum to the same value of 3. This is because, for example, the distances of 1, 1 and 1 correspond to a lower peak deviation from the performance boundary curve for each maximum bit rate setting. One of ordinary skill in the art would recognize that a wide variety of optimization algorithms can be used to determine the encoding profiles corresponding to profile 471, 472, and 473 used to optimize a distance-based cost function. For the example of FIG. 4A, algorithms including but not limited to least-squares, linear programming, and variants of heuristic-based search algorithms can be used to perform convex optimization. In another class of implementations, a cost function may be used that minimizes the per-maximum bit rate distances (e.g., the individual vectors 471a, 472a, and 473a that are perpendicular to performance boundary curve 465). In those implementations, the cost function may sequentially select the encoding profiles (e.g., profiles 471, 472, and 473). If desired and in those and other implementations, the cost function may also include one or more constraints to ensure that the selected encoding profiles are spaced apart from each other (e.g., to ensure that no two profiles are so similar as to be duplicative, nor so far apart as to omit valuable intermediate profiles). As an example, the cost function may include a constraint that each adjacent (along the bitrate axis) pair of encoding profiles should be separated by a VMAF differential of approximately 6 (e.g., since a change in VMAF of 6 may be considered the smallest change resulting in a user-observable different in video quality). As another example, the cost function may include a constraint that each adjacent pair of encoding profiles should be separated by a VMAF differential of no more than approximately 12. As another example, the cost function may include a constraint that each adjacent pair of encoding profiles should be separated by a bitrate differential of 20% (or some other factor such as 10%, 15%, 25%, 30%, etc.). If desired, the cost function may include a constraint that each adjacent pair of encoding profiles is separated by no more than a bitrate differential of 40% (or some other factor such as 20%, 25%, 30%, 35%, etc.).

FIG. 4B illustrates using an area-based cost function to determine an optimal encoding ladder for a bitrate-quality data space of a single video segment. Profile 481 is associated with the pruned trial encoding outputs with 1950 kbps for the maximum bit rate, profile 482 corresponds to the 5000 kbps maximum bit rate, and profile 483 corresponds to the 9000 kbps maximum bit rate. The area-based cost function utilized in FIG. 4B, similar to the distance-based cost function of FIG. 4A, accounts for bit rate-quality trade-offs across the three maximum bit rate settings. However, rather than minimizing the sum of the distances of the three star points, the area-based cost function maximizes the area under the performance boundary curve 465 formed by the polygon 490 having the six vertices at profile 481, 482, and 483, and points cmax, c0, and cb. It should be appreciated that by maximizing the area, the cost-function of FIG. 4B is minimizing the area corresponding to the deviation between the polygon 490 and the performance boundary curve 465. In a class of implementations, relative to the distance-based cost function, the area-based cost function provides more degrees of freedom in optimizing the relationship between different encoding profiles in the adaptive encoding ladder. For example, there may be various sets of points for profile 481, 482, and 483 that result in the same set of distances to performance boundary curve 465, but the various sets of points may correspond to different areas under the performance boundary curve 465, with one set of points corresponding to a maximum area. It should further be appreciated that because the cost function for FIG. 4B involves six points, specifically, profile 481, 482, and 483, and points cmax, c0, and cb, more flexibility is provided relative to the cost function for FIG. 4A, which involves three points, specifically, profile 471, 472, and 473. For example, for the area-based cost function of FIG. 4B, the additional configurability of the points cmax, c0, and cb provide more freedom in emphasizing different ends of the performance boundary curve 465 (e.g., adjusting the cmax point corresponding to the point with the highest quality, or adjusting the c0 point corresponding to the point with the lowest quality). As one example, by adjusting cmax to alter the area under the portion of the performance boundary curve 465 corresponding to higher bit rates, for the encoding profiles selected for the encoding ladder, the quality to bit rate tradeoff can be weighted to favor greater quality for the 9000 kbps maximum bit rate, and a lower quality for the 1950 kbps maximum bit rate.

It should be appreciated that even though FIG. 4A and FIG. 4B illustrates only the 2-dimensional data space (i.e. bit rate and quality data space) for clarity purposes, the described techniques can be applied to any n-dimensional space to satisfy various constraints superimposed by any combination of bit rate, quality, encoding runtime, network bandwidth, playback devices limitations, end-user distribution and geographic constraints, etc.

Figure 5:
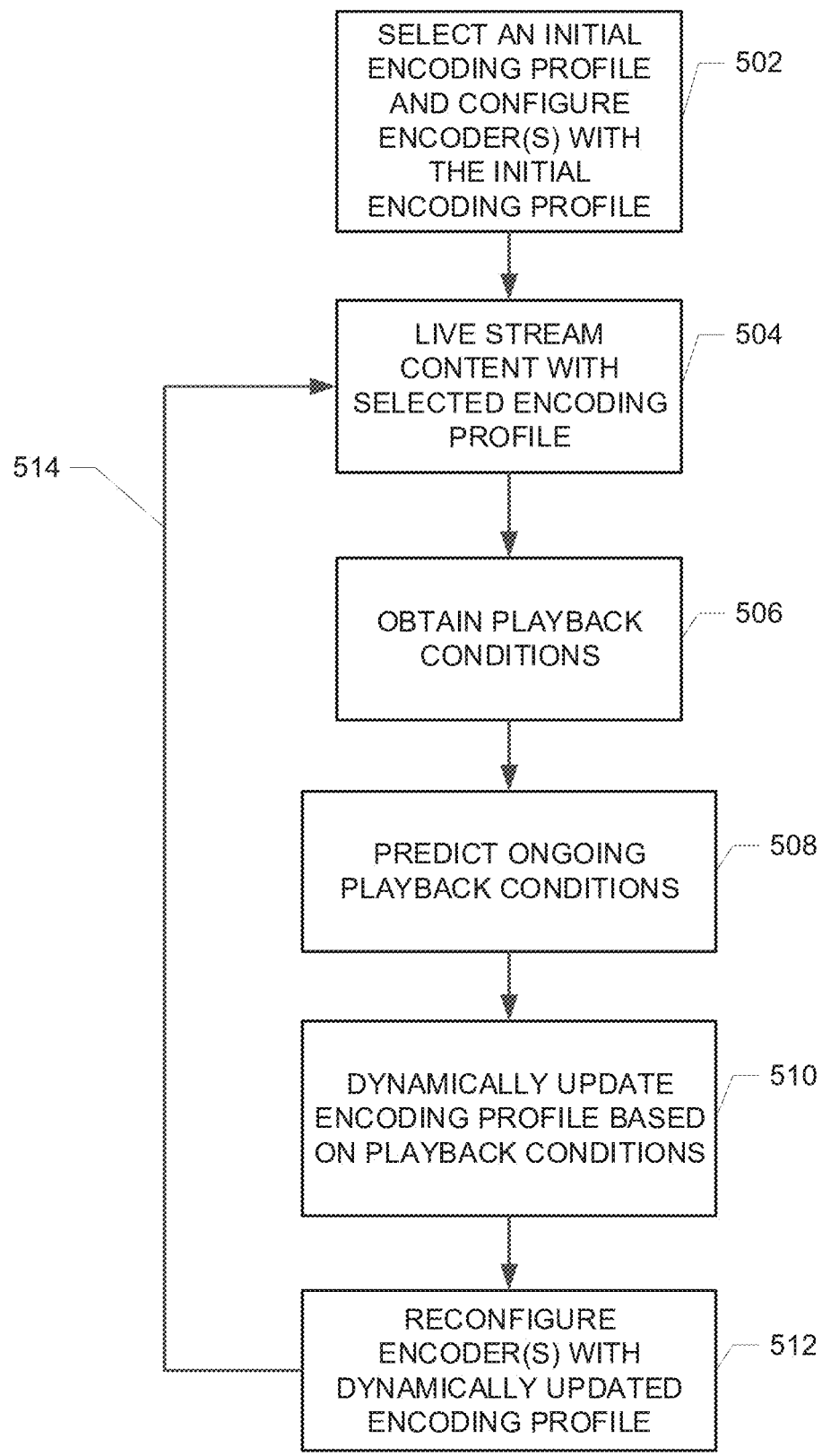
FIG. 5 is a flowchart illustrating processes for dynamically adjusting live event content encoding ladders based on changing playback conditions.

FIG. 5 illustrates a flowchart for dynamically adjusting live event content encoding ladders based on changing playback conditions.

In a class of implementations, dynamically adjusting live event content encoding ladders based on changing playback conditions may include selecting (502) an initial encoding profile and configuring encoder(s) with the initial encoding profile. The initial encoding profile may be a generic encoding profile not optimized for any particular set of playback conditions. In other embodiments, the initial encoding profile is optimized for a set of playback conditions based on a prediction of the likely playback conditions for the live content to be streamed. As an example, when the live content is a Premier League soccer game, selecting the initial encoding profile (502) can include analyzing past live streams of Premier League soccer games to determine what playback conditions are most common and identifying and selecting an encoding profile suitable for such playback conditions. After selecting an initial encoding profile, content is live streamed (504) using the selected encoding profile.

In a class of implementations and during the live stream (504), playback conditions may be measured or otherwise obtained (506). As examples, obtaining the playback conditions (506) may include identifying an amount of network capacity available to the streaming services, statistical information (e.g., number, mean, average, standard deviations, distributions, etc.) on the amount of network capacity (e.g., bandwidth and/or latency) available to client devices receiving the live stream, statistical information on the display sizes of the client devices receiving the live stream, and other playback condition information.

The obtained playback conditions (504) may, in some implementations, be used in optionally predicting ongoing playback conditions (508). Predicting ongoing playback conditions (508) may involve, as examples, extrapolating trendlines in the playback conditions and making predictions based on patterns in past live streams of similar content. An example of extrapolating trendlines in the playback conditions is determining that the mix of client devices has been trending towards devices with smaller screens and predicting that the mix would continue to shift towards devices with smaller screens. An example of making predictions based on patterns in past live streams of similar content is determining that similar events (e.g., events of a similar content type) had patterns in their playback conditions (e.g., after some number of minutes, the mix of client devices typically shifted towards devices with larger screens) and therefore predicting that the present live stream will likely also exhibit similar trendlines.

In a class of implementations, the obtained playback conditions (506) and/or the optional predicted playback conditions (508) may be used to dynamically update the encoding profile (510) and then reconfigure the encoder(s) with the new encoding profile (512). As an example, when the initial (or current) encoding profile is optimized for a first set of playback conditions, but the obtained playback conditions (506) and/or the optional predicted playback conditions (508) indicate that the playback conditions diverge from that first set of playback conditions, the streaming service may dynamically swap the encoding profile to a profile better optimized for the actual or predicted playback conditions. In general, it may be desirable for the live streaming service to only switch or update the encoding profile in use when the playback conditions change more than a threshold amount. By requiring more than a threshold change in the playback conditions to initial a change in encoding profile, excessive switching of the encoding profile is avoided. As indicated by line 514, the processes of live streaming content, obtaining and/or predicting playback conditions, and dynamically updating the encoding profile based on changes in playback conditions may be repeated (e.g., continuously or on recurring basis) throughout some or all of the live stream.

It should be appreciated that video samples as referred to herein may be entire video presentations (e.g., an entire movie or sportscast), groups of video presentations, or may be shorter segments within a presentation, e.g., 2-60 second segments including one or more 2-10 second fragments or "groups of pictures" (GOPs). Additionally, it should be appreciated that the video samples as referred to herein may be in a variety of formats and resolutions and may include standard dynamic range (SDR) and high dynamic range (HDR) video content.

It should be noted that the techniques described herein are agnostic to specific codec implementation, and may be employed to configure encoders implemented according to any of a wide variety of video compression standards including, for example, Advanced Video Coding (AVC) or H.264, High Efficiency Video Coding (HEVC) or H.265, AV1, VP8, and VP9, as well as future standards, e.g., H.266.

It should further be appreciated that the disclosed techniques are compatible with both live and on demand applications, and are applicable to video, audio, and other forms of media content.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
   encoding a first portion of content using a first set of encoding profiles corresponding to a codec thereby generating a first set of representations of the content, each representation of the first set of representations corresponding to one of the encoding profiles of the first set of encoding profiles;
   conducting first streaming sessions using the first set of representations of the content;
   in response to a first playback condition associated with the first streaming sessions, encoding a second portion of the content using a second set of encoding profiles corresponding to the codec thereby generating a second set of representations of the content, each representation of the second set of representations corresponding to one of the encoding profiles of the second set of encoding profiles, the second portion of the content being later than the first portion of the content relative to a timeline of the content, the second set of encoding profiles being different than the first set of encoding profiles; and
   conducting second streaming sessions using the second set of representations of the content.

2. The method of claim 1, further comprising selecting the first set of encoding profiles based on a prediction relating to the first playback condition.

3. The method of claim 2, further comprising selecting the second set of encoding profiles based on a difference between the prediction and the first playback condition.

4. The method of claim 1, further comprising determining the first and second sets of encoding profiles based on analysis of previous streaming sessions having previous playback conditions associated therewith, the first and second sets of encoding profiles each being optimized for a corresponding subset of the previous playback conditions.

5. The method of claim 1, wherein the first playback condition represents a number of the first streaming sessions, a portion of the first streaming sessions corresponding to a display size range, a portion of the first streaming sessions corresponding to a display resolution range, a portion of the first streaming sessions corresponding to a network connection type, a measure of network latency associated with the first streaming sessions, a measure of network bandwidth associated with the first streaming sessions, a measure of computational resources associated with the first streaming sessions, a geographic distribution associated with the first streaming sessions, or a representation of one or more playback limitations of client devices associated with the first streaming sessions.

6. The method of claim 1, wherein the first set of representations of the content corresponds to a first set of options for bitrates and resolutions, and the second set of representations of the content corresponds to a second set of options for bitrates and resolutions, the first and second sets of options being different.

7. The method of claim 1, further comprising determining the first playback condition by monitoring a trend relating to the first playback condition, and extrapolating the trend.

8. A system, comprising memory and one or more processors configured to:
   encode a first portion of content using a first set of encoding profiles corresponding to a codec thereby generating a first set of representations of the content, each representation of the first set of representations corresponding to one of the encoding profiles of the first set of encoding profiles;
   conduct first streaming sessions using the first set of representations of the content;
   in response to a first playback condition associated with the first streaming sessions, encode a second portion of the content using a second set of encoding profiles corresponding to the codec thereby generating a second set of representations of the content, each representation of the second set of representations corresponding to one of the encoding profiles of the second set of encoding profiles, the second portion of the content being later than the first portion of the content relative to a timeline of the content, the second set of encoding profiles being different than the first set of encoding profiles; and
   conduct second streaming sessions using the second set of representations of the content.

9. The system of claim 8, wherein the memory and one or more processors are further configured to select the first set of encoding profiles based on a prediction relating to the first playback condition.

10. The system of claim 9, wherein the memory and one or more processors are further configured to select the second set of encoding profiles based on a difference between the prediction and the first playback condition.

11. The system of claim 8, wherein the memory and one or more processors are further configured to determine the first and second sets of encoding profiles based on analysis of previous streaming sessions having previous playback conditions associated therewith, the first and second sets of encoding profiles each being optimized for a corresponding subset of the previous playback conditions.

12. The system of claim 8, wherein the first playback condition represents a number of the first streaming sessions, a portion of the first streaming sessions corresponding to a display size range, a portion of the first streaming sessions corresponding to a display resolution range, a portion of the first streaming sessions corresponding to a network connection type, a measure of network latency associated with the first streaming sessions, a measure of network bandwidth associated with the first streaming sessions, a measure of computational resources associated with the first streaming sessions, a geographic distribution associated with the first streaming sessions, or a representation of one or more playback limitations of client devices associated with the first streaming sessions.

13. The system of claim 8, wherein the first set of representations of the content corresponds to a first set of options for bitrates and resolutions, and the second set of representations of the content corresponds to a second set of options for bitrates and resolutions, the first and second sets of options being different.

14. The system of claim 8, wherein the memory and one or more processors are further configured to determine the first playback condition by monitoring a trend relating to the first playback condition, and extrapolating the trend.

15. A computer program product, comprising one or more non-transitory computer-readable media having computer program instructions stored therein, the computer program instructions being configured such that, when executed by one or more computing devices, the computer program instructions cause the one or more computing devices to:

encode a first portion of content using a first set of encoding profiles corresponding to a codec thereby generating a first set of representations of the content, each representation of the first set of representations corresponding to one of the encoding profiles of the first set of encoding profiles;

conduct first streaming sessions using the first set of representations of the content;

in response to a first playback condition associated with the first streaming sessions, encode a second portion of the content using a second set of encoding profiles corresponding to the codec thereby generating a second set of representations of the content, each representation of the second set of representations corresponding to one of the encoding profiles of the second set of encoding profiles, the second portion of the content being later than the first portion of the content relative to a timeline of the content, the second set of encoding profiles being different than the first set of encoding profiles; and conduct second streaming sessions using the second set of representations of the content.

16. The computer program product of claim 15, wherein the computer program instructions are further configured to cause the one or more computing devices to select the first set of encoding profiles based on a prediction relating to the first playback condition.

17. The computer program product of claim 16, wherein the computer program instructions are further configured to cause the one or more computing devices to select the second set of encoding profiles based on a difference between the prediction and the first playback condition.

18. The computer program product of claim 15, wherein the computer program instructions are further configured to cause the one or more computing devices to determine the first and second sets of encoding profiles based on analysis of previous streaming sessions having previous playback conditions associated therewith, the first and second sets of encoding profiles each being optimized for a corresponding subset of the previous playback conditions.

19. The computer program product of claim 15, wherein the first set of representations of the content corresponds to a first set of options for bitrates and resolutions, and the second set of representations of the content corresponds to a second set of options for bitrates and resolutions, the first and second sets of options being different.

20. The computer program product of claim 15, wherein the computer program instructions are further configured to cause the one or more computing devices to determine the first playback condition by monitoring a trend relating to the first playback condition, and extrapolating the trend.

* * * * *